United States Patent
Baumann et al.

(10) Patent No.: US 11,962,207 B2
(45) Date of Patent: Apr. 16, 2024

(54) METHODS AND APPARATUS FOR MANUFACTURING A STATOR FOR AN ELECTRIC AIRCRAFT MOTOR

(71) Applicant: BETA AIR, LLC, South Burlington, VT (US)

(72) Inventors: Fabian Baumann, South Burlington, VT (US); Brandon White, South Burlington, VT (US); Raffaello Verna, South Burlington, VT (US)

(73) Assignee: BETA AIR, LLC, South Burlington, VT (US)

( * ) Notice: Subject to any disclaimer, the term of this patent is extended or adjusted under 35 U.S.C. 154(b) by 0 days.

(21) Appl. No.: 17/892,816

(22) Filed: Aug. 22, 2022

(65) Prior Publication Data
US 2024/0063699 A1    Feb. 22, 2024

(51) Int. Cl.
*H02K 15/00* (2006.01)
*B64F 5/10* (2017.01)
*H02K 15/06* (2006.01)
*H02K 15/10* (2006.01)
*B64C 29/00* (2006.01)

(52) U.S. Cl.
CPC ............. *H02K 15/064* (2013.01); *B64F 5/10* (2017.01); *H02K 15/10* (2013.01); *B64C 29/0008* (2013.01)

(58) Field of Classification Search
CPC .... H02K 15/02; H02K 15/024; H02K 15/026; H02K 15/028; H02K 15/0414; H02K 15/06; H02K 15/085; H02K 15/10
See application file for complete search history.

(56) References Cited

U.S. PATENT DOCUMENTS

| | | | |
|---|---|---|---|
| 6,894,414 B1 * | 5/2005 | Asao | H02K 15/024 310/179 |
| 8,847,522 B2 | 9/2014 | Nashiki | |
| 9,148,040 B2 | 9/2015 | Anthony | |
| 2018/0152083 A1 * | 5/2018 | Schmid | H02K 15/105 |
| 2019/0074735 A1 * | 3/2019 | Shono | H02K 1/165 |
| 2021/0044159 A1 | 2/2021 | Sawata | |

(Continued)

FOREIGN PATENT DOCUMENTS

| | | | | |
|---|---|---|---|---|
| EP | 1120881 A2 * | 8/2001 | | H02K 1/16 |
| EP | 1246341 A2 * | 10/2002 | | H02K 1/16 |
| EP | 3826147 A1 | 5/2021 | | |

(Continued)

*Primary Examiner* — Emmanuel M Marcelo
(74) *Attorney, Agent, or Firm* — Brake Hughes Bellermann LLP

(57) ABSTRACT

An apparatus for manufacturing a stator for an electric aircraft motor, wherein the apparatus includes at least a manufacturing device. The manufacturing device further includes at least a work-holding device configured to hold a first segment of teeth. The manufacturing device further includes at least a winding device configured to create a modular winding set in the first segment of teeth, wherein creating a modular winding set further include acquiring a continuous conductor and winding a continuous conducting coil upon each tooth of the plurality of teeth using the continuous conductor. The manufacturing device further includes at least an installation device configured to install a plurality of segment of teeth into the stator.

16 Claims, 7 Drawing Sheets

(56) References Cited

U.S. PATENT DOCUMENTS

2021/0226513 A1    7/2021  Sawata
2021/0249926 A1*  8/2021  Enomoto ................. H02K 3/34

FOREIGN PATENT DOCUMENTS

| JP | 2006042500 A | * | 2/2006 | | |
| JP | 2020205721 A | * | 12/2020 | | |
| WO | WO-2012169059 A1 | * | 12/2012 | ............. | H02K 3/325 |

* cited by examiner

METHODS AND APPARATUS FOR MANUFACTURING A STATOR FOR AN ELECTRIC AIRCRAFT MOTOR

FIELD OF THE INVENTION

The present invention generally relates to the field of electric aircraft. In particular, the present invention is directed to methods and apparatus for manufacturing a stator configured for use in electric aircraft motor.

BACKGROUND

In stator manufacturing for electric aircraft, motors commonly have individual teeth wound then soldered or joined to create multiple phase segments.

SUMMARY OF THE DISCLOSURE

In an aspect the present disclosure is directed to an apparatus for manufacturing a stator for an electric aircraft motor, wherein the apparatus includes at least a manufacturing device. The manufacturing device further includes at least a work-holding device configured to hold a first segment of teeth. The manufacturing device further includes at least a winding device configured to create a modular winding set in the first segment of teeth, wherein creating a modular winding set further include acquiring a continuous conductor and winding a continuous conducting coil upon each tooth of the plurality of teeth using the continuous conductor. The manufacturing device further includes at least an installation device configured to install a plurality of segment of teeth into the stator.

In another aspect, a method for manufacturing a stator for an electric aircraft motor is shown. The method includes holding, using a work-holding device, a first segment of teeth. The method further includes creating, using a winding device, a modular winding set in the first segment of teeth, wherein creating a modular winding set further comprises acquiring a continuous conductor and winding the continuous conducting coil upon each tooth of the plurality of teeth using the continuous conductor. The method further includes installing, using an installation device, a plurality of segment of teeth into the stator.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

In the following description, for the purposes of explanation, numerous specific details are set forth in order to provide a thorough understanding of the present invention. It will be apparent, however, that the present invention may be practiced without these specific details. As used herein, the word "exemplary" or "illustrative" means "serving as an example, instance, or illustration." Any implementation described herein as "exemplary" or "illustrative" is not necessarily to be construed as preferred or advantageous over other implementations. All the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 5. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply embodiments of the inventive concepts defined in the appended claims. Hence, specific dimensions and other physical characteristics relating to the embodiments disclosed herein are not to be considered as limiting, unless the claims expressly state otherwise.

At a high level, aspects of the present disclosure are directed to apparatus and method for manufacturing a stator for electric aircraft motor. The apparatus may include at least a manufacturing device and a computing device communicatively connected to the manufacturing device. The manufacturing device may further include at least a work-holding device configured to hold a first segment of teeth. The manufacturing device may further include at least a winding device configured to create a modular winding set in the first segment of teeth. A continuous conductor may be then acquired by the at least a winding device and wound upon each tooth of plurality of teeth. The manufacturing device may further include at least an installation device configured to install a plurality of segments of teeth into the stator.

Figure 1:
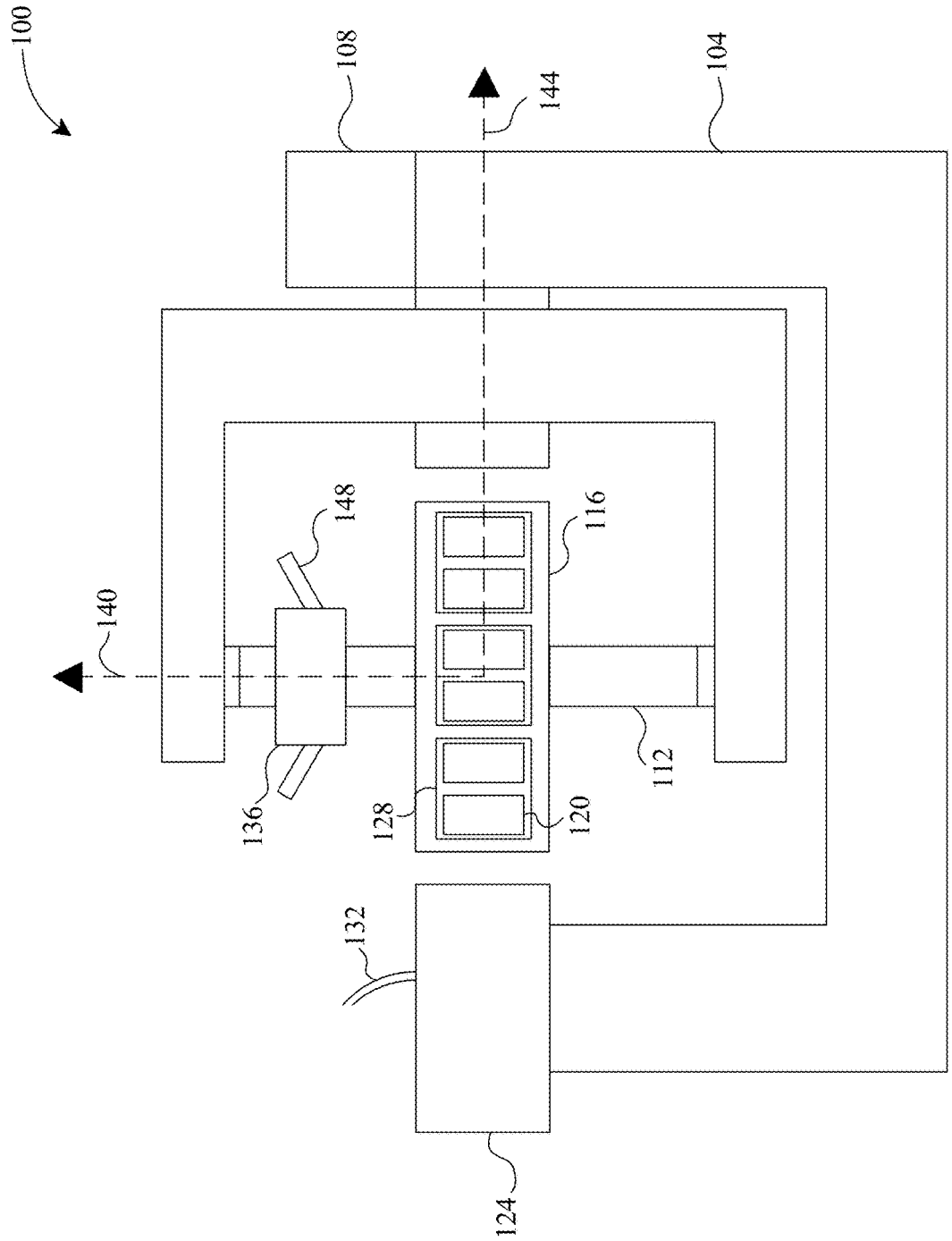
FIG. 1 is a block diagram of an exemplary embodiment of an apparatus for manufacturing a stator for electric aircraft motor.

Referring now to FIG. 1, an exemplary embodiment of an apparatus 100 for manufacturing a stator for an electric aircraft motor is illustrated. A "stator", as used herein, is a stationary component of a motor and/or motor assembly. In an embodiment, the stator may have an inner and outer cylindrical surface; a plurality of magnetic poles may extend outward from the outer cylindrical surface of the stator. In an embodiment, stator may include an annular stator, wherein the stator is ring-shaped. In an embodiment, stator is incorporated into a DC motor where stator is fixed and functions to supply the magnetic fields where a corresponding rotor rotates. In an embodiment, stator is incorporated an AC motor where the stator is fixed and functions to supply the magnetic fields by radio frequency electric currents through an electromagnet to a corresponding rotor. As used herein, a "rotor" is a portion of an electric motor that rotates with respect to a stator of the electric motor.

The apparatus 100 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Apparatus 100 may include a single computing device operating independently, or may include two or more computing device operating in concert, in parallel, sequentially or the like; two or more computing devices may be included together in a single computing device or in two or more computing devices. Apparatus 100 may interface or communicate with one or more additional devices as described below in further detail via a network interface device. Network interface device may be utilized for connecting apparatus 100 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Apparatus 100 may include but is not limited to, for example, a computing device or cluster of computing devices in a first location and a second computing device or cluster of computing devices in a second location. Apparatus 100 may include one or more computing devices dedicated to data storage, security, distribution of traffic for load balancing, and the like. Apparatus 100 may distribute one or more computing tasks as described below across a plurality of computing devices of computing device, which may operate in parallel, in series, redundantly, or in any other manner used for distribution of tasks or memory between computing devices. Apparatus 100 may be implemented using a "shared nothing" architecture in which data is cached at the worker. In an embodiment, this may enable scalability of apparatus 100 and/or computing device.

With continued reference to FIG. 1, the apparatus 100 includes at least a manufacturing device 104. The manufacturing device 104 may include an automated manufacturing system. In some embodiments, an automated manufacturing system may include a controller 108 that controls one or more manufacturing steps automatically. Controller 108 may include a sequential control device that produces a sequence of commands without feedback from other components of automated manufacturing system. Controller 108 may include a feedback control device that produces commands triggered or modified by feedback from other components. Controller may perform both sequential and feedback control. In some embodiments, controller 108 includes a mechanical device. In other embodiments, controller 108 includes an electronic device. Electronic device may include digital or analog electronic components, including without limitation one or more logic circuits, such one or more logic gates, programmable elements such as field-programmable arrays, multiplexors, one or more operational amplifiers, one or more diodes, one or more transistors, one or more comparators, and one or more integrators. Electronic device may include a processor. Electronic device may include a computing device. Computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Electronic device may include a single computing device operating independently, or may include two or more computing device operating in concert, in parallel, sequentially or the like; two or more computing devices may be included together in a single computing device or in two or more computing devices. Electronic device may interface or communicate with one or more additional devices as described below in further detail via a network interface device. Network interface device may be utilized for connecting electronic device to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Electronic device may include but is not limited to, for example, a computing device or cluster of computing devices in a first location and a second computing device or cluster of computing devices in a second location. Electronic device may include one or more computing devices dedicated to data storage, security, distribution of traffic for load balancing, and the like. Electronic device may distribute one or more computing tasks as described below across a plurality of computing devices of computing device, which may operate in parallel, in series, redundantly, or in any other manner used for distribution of tasks or memory between computing devices. Electronic device may be implemented using a "shared nothing" architecture in which data is cached at the worker, in an embodiment, this may enable scalability of apparatus 100 and/or computing device. Additionally, controller 108 may include a manufacturer client of plurality of manufacturer clients; controller 108 may be communicatively coupled to a manufacturer client of plurality of manufacturer clients.

With continued reference to FIG. 1, controller 108 may include a component embedded in manufacturing device 104; as a non-limiting example, controller 108 may include a microcontroller, which may be housed in a unit that combines the other components of manufacturing device 104. Further continuing the example, microcontroller may have program memory, which may enable microcontroller to load a program that directs manufacturing device 104 to perform an automated manufacturing process. Similarly, controller 108 may include any other components of a computing device as described below in a device housed within manufacturing device 104. In other embodiments, controller 108 includes a computing device that is separate from the rest of the components of manufacturing device; for instance, controller may include a personal computer, laptop, or workstation connected to the remainder of manufacturing device by a wired or wireless data connection. In some embodiments, controller 108 includes both a personal computing device where a user may enter instructions to generate a program for turning workpiece into a finished product, and an embedded device that receives the program from the personal computing device and executes the program. Persons skilled in the art will be aware of various ways that a controller, which may include one or more computing devices, may be connected to, or incorporated in an automated manufacturing system as described above.

With continued reference to FIG. 1, controller 108 may control components of automated manufacturing system; for instance, controller 108 may control elements within the manufacturing device 104 including without limitation tool changers to switch endmills, spindle or gear systems operatively coupled to spindle to regulate spindle rotational speed, linear movement of manufacturing tool, base table, or both, and rotation or rotational position of rotary table. As an example, controller 108 may coordinate deposition and/or curing of material in additive manufacturing processes, where manufacturing device is an additive manufacturing device. In an embodiment, controller 108 may control elements within the manufacturing device 104 including, but is not limited to, work-holding device 112 to fix a plurality of mechanical parts, winding device 124 to wind a material onto a plurality of mechanical parts and installation device 136 to connect a plurality of mechanical parts. The work-holding device 112, winding device 124, and installation device 136 will be disclosed in further detail below. Persons skilled in the art, upon reading the entirety of this disclosure, will be aware of similar automated control systems usable for various forms manufacturing.

With continued reference to FIG. 1, controller 108 may be designed and/or configured to perform any method, method step, or sequence of method steps in any embodiment described in this disclosure, in any order and with any degree of repetition. For instance, controller 108 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Controller 108 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

The manufacturing device 104 may further include at least a work-holding device 112 configured to hold a first segment of teeth 116. A "work-holding device," as described herein, is a tool or machine that is used in the manufacturing industry to securely locate (position in a specific location or orientation) and support the work, ensuring that all parts produced using this device will maintain conformity and interchangeability. The work-holding device 112 may apply different levels of grip on the workpiece. The workpiece may be unable or difficult to move horizontally and/or vertically when the work-holding device is applying the grip. In an embodiment, the work-holding device 112 may move horizontally and/or vertically relative to the workpiece. The work-holding device 112 may also move the workpiece horizontally and/or vertically while the device remains stationary. In an embodiment, the work-holding device 112 may be able to rotate the workpiece at plurality of different angle and/or degrees. In a non-limited example, the work-holding device 112 may be a fixture, and the workpiece may be the first segment of teeth 116. In an embodiment, work-holding device 112 may be controlled by the computing device described in further detail below.

With continued reference to FIG. 1, a "segment of teeth," as described herein, is a segment of a stator that contains a combination of a plurality of teeth 116. In some cases, a segment may include teeth of a single phase. In an embodiment, the first segment of teeth 116 may contain nine teeth. In an embodiment, there may be 3 segments of teeth within one stator. A "tooth," as described herein, is a component attached to the inner cylindrical surface of the stator and, when assembled in a motor, extending toward a cylindrical surface of a rotor. In some embodiments, the tooth 120 may include an inner tooth end and an outer tooth end, wherein the inner tooth end has a first width, and the outer tooth end has a second width. In some embodiments, the first width is different from the second width. In some embodiments, the tooth 120 may gradually increase the width from the first width to the second width. Alternatively, or additionally, the tooth 120 may increase the width from the first width to the second width precipitously. For example, in some embodiments, the tooth 120 may have a "T" shape when viewed from the plane normal to the axis of rotation of the motor.

With continued reference to FIG. 1, obtaining the first segment of teeth 116 using the work-holding device 112 of the manufacturing device 104 in apparatus 100 may further include insulating the tooth body of each tooth 120 in the first segment of teeth 116. As used in the current disclosure, "insulating" is to separate the conducting bodies with non-conductors to prevent transfer of electricity, and/or heat, and/or sound. A "tooth body," as described herein, is the portion of the tooth located between the inner tooth end and the outer tooth end. Insulating the tooth body of each tooth 120 in the first segment of teeth 116 may further contain using an insulation material, wherein the insulation material may include, but is not limited to fiberglass, mineral wool, cellulose, natural fibers, polystyrene, polyisocyanurate, polyurethane, perlite, cementitious foam, phenolic foam, insulation facings, and the like. In an embodiment, one or more fiberglass sheet may be applied to the tooth body of each tooth 120 of the plurality of teeth of the segment of teeth.

With continued reference to FIG. 1, manufacturing device 104 is further configured to create at least a service loop of a predetermined length between adjacent teeth 120. A "service loop," as used in this disclosure, is the extra length of the wire included in an electromechanical assembly. The purpose of the service loop may be to provide, without limitation, neatness, accessibility, freedom of movement, serviceability, reliability, safety, and the like. In an embodiment, the predetermined length may be equal to the distance between two adjacent teeth 120. In another embodiment, the predetermined length may be greater than the distance between two adjacent teeth 120. In some cases, segment of teeth 116 may include a plurality of service loops. In some cases, service loop may be captured and/or held by installation device 136. Installation device 136 disclosed here will be described in further detail below.

With continued reference to FIG. 1, the manufacturing device 104 in the apparatus 100 includes at least a winding device 124 configured to create a modular winding set 124 in the first segment of teeth 116. A "winding device," as described herein, is a machine or device for wrapping a first material onto a second material or object. The first material may be soft, and/or bendable, and/or malleable, and/or the like. The first material may be a wire. In some embodiments, the first material may include metal. In some embodiments, the first material may be a wire including copper. In other embodiments, the first material may be a wire including steel. The second material may be solid, and/or rigid, and/or stable, and/or the like. In a non-limited example, the second material may be the first segment of teeth 116. In some embodiments, the winding device 124 may contain a center roll which may include, but is not limited to, a bobbin, spool, reel, belt-winding shell, and the like. The center roll may include a circular bar, square bar, or bar shaped according to intended purpose which travel through the center of the roll. In some embodiments, the winding device may contain an edge sensor. An "edge sensor," as described herein, is a sensor that senses how full the center roll is or a thickness of the first material on the second material. The edge sensor may be mounted or installed on adjustable slides to accommodate different widths. In an embodiment, the winding device 124 may be controlled by the computing device described in further detail below. A "modular winding set," as described herein, is a set of teeth or wound teeth within the same phase. In an embodiment, the first segment of teeth 116 may include a plurality of modular winding sets 128. A "phase," as described herein, is a stage of a single current carried by a conductor. The current may be an alternating current. Alternating current may be created by a generator which includes a characteristic that its amplitude and direction changes with time. In an embodiment, the modular winding set 128 may include a plurality of phases, and each phase of the plurality of phases in the modular winding set may contain a phase difference of certain degree. In a non-limited example, a motor may include three segments of teeth 112, and each segment of teeth may include three modular winding sets 128, wherein each modular winding set 128 contain three phases and is operating at a phase difference of 120 degrees or $2\pi/3$ radians apart. In some embodiments, a motor may include two segments of teeth 116, and each segment of teeth may include two modular winding sets 128, wherein each modular winding set 128 contain two phases and is operating at a phase difference of 90 degrees or $\pi/2$ radians apart. In other embodiments, a motor may include one segment of teeth 116, and each segment of teeth may include a single modular winding set 128, wherein the single modular winding set 128 contains a single phase and operates at no phase difference. In some cases, first segment of teeth 116 may include a plurality of modular winding sets.

With continued reference to FIG. 1, modular winding set 128 may include a single phase. As used in this disclosure, a "single phase" is an electric conductor winding where there is only one phase contained within stator when there is electric current running through the electric conductor winding. In a non-limiting example, single continuous conductor may be wrapped around each tooth 120 of plurality of teeth of segment of teeth 116. In some embodiments, modular winding set 128 may include a plurality of multiphase windings. As used in this disclosure, a "multiphase winding" is an electric conductor winding where there is more than one phrase contained within the stator when there is electric current running through the electric conductor winding. In some embodiments, a first modular winding set 128 may have a different multiphase winding than a second modular winding set 128. In a non-limiting example, the multiphase winding of three phases for a segment of teeth 116 (or in other words, a segment of teeth 116 that contains three modular winding sets 128), wherein the segment of teeth 116 contains nine teeth 120, a first continuous conductor may be wrapped around the first, fourth, and seventh teeth 120 of the segment of teeth 116, a second continuous conductor may be wrapped around the second, fifth, and eighth teeth 120 of the segment of teeth 116, and a third continuous conductor may be wrapped around the third, sixth, and ninth teeth 120 of the segment of teeth 116. The multiphase winding may further include insulation at the end turns. As used in this disclosure, an "end turn" is an area in the segment of teeth where the continuous conductor 132 comes out of the segment of teeth and re-enters the segment of teeth. For example, the end turn may be a conducting coil head. In another example, the end turn may be a service loop. A "conducting coil head," as described in this disclosure, is an end portion of a conducting coil that can be connected to a power source or another conducting coil head. The insulation material may include, but is not limited to fiberglass, mineral wool, cellulose, natural fibers, polystyrene, polyisocyanurate, polyurethane, perlite, cementitious foam, phenolic foam, insulation facings, and the like.

With continued reference to FIG. 1, creating a modular winding set 124 in of the first segment of teeth further include acquiring the first material such as a continuous conductor 132. A "continuous conductor," as described herein, is an electrical conductor, without any interruption, made from electrically conducting material that is capable of carrying electrical current. Electrically conductive material may comprise copper for example. Electrically conductive material may include any material that is conductive to electrical current and may include, as a nonlimiting example, various metals such as copper, steel, or aluminum, carbon conducting materials, or any other suitable conductive material. Persons skilled in the art, upon reviewing the entirety of this disclosure, will be aware of various forms of electrically conductive material that may be used as windings on a tooth consistent with the described methods and systems. In some embodiments, the continuous conductor may include a continuous multi-stranded conducting wire. A "multi-stranded conducting wire," is a bundle of a plurality of conducting wires. The multi-stranded conducting wire may be more flexible than solid wire of the same total cross-sectional area as the bundle. A "conducting wire," as used in this disclosure, is an electrically conductive wire that is capable of carrying electricity over a distance.

With continued reference to FIG. 1, creating a modular winding set 128 in the first segment of teeth 116 further includes winding a continuous conducting coil upon each tooth 120 of plurality of teeth using the continuous conductor 132, thereby creating a winding for each tooth 120. As used in this disclosure, a "continuous conducting coil" is a winding of a continuous conductor 132 in a plurality of rounds. As used in this disclosure, a "round" is one wrap around a tooth 120. Persons skilled in the art, upon reviewing the entirety of this disclosure, will be aware of various methods of winding electrical windings on at least a tooth 120 that may be consistent with the described methods and systems. Additionally, the continuous conductor 132 may be wound on the tooth in parallel, or perpendicular to the axis of rotation of work-holding device 112. In a non-limited example, the winding device 124 may be a coil winding machine, which wraps the continuous conductor 132 (first material), wherein the continuous conductor 132 may include 13 conducting wires, onto the first segment of teeth 116 (second material) for a continuous conducting coil with 10 rounds, perpendicular to the axis of rotation of work-holding device 112.

With continued reference to FIG. 1, winding the continuous conducting coil may further include attaching the continuous conductor to the tooth 120 using heat and/or chemical resistant cord and/or material. The heat resistant cord material may include, but is not limited to aramid, Inconel 600, polyurethane, Kevlar, sealant, and the like. In some embodiments, attaching the continuous conductor to the tooth 120 may include using chemical resistant cord material. The chemical resistant cord material may include, but is not limited to PP, PVDF, Nylon and the like. As described herein, "attach" to the tooth means binding, fastening, or otherwise securing the continuous conductor around the tooth to ensure the continuous conductor remains fixed while the rotor is rotating. In a non-limited example, a polypropylene cord may be used to group all the rounds of the continuous conductor 132 and tightly tie to the tooth 120.

With continued reference to FIG. 1, the manufacturing device 104 in the apparatus 100 includes at least an installation device 136 configured to install a plurality of segments of teeth 116 into the stator. As used in this disclosure, an "installation device" is a device or machine that provides support that eases the assembly and/or disassembly process of a plurality of parts. In an embodiment, the installation device 136 may include support for mechanical fastening, wherein the mechanical fastening may include, but is not limited to tightening the screws, bolts, rivets, and/or the like. In an embodiment, the installation device 136 may include support for ultrasonic assembly, wherein the ultrasonic assembly may include, but is not limited to, ultrasonic welding, ultrasonic spot welding, ultrasonic staking, ultrasonic inserts, and the like. In an embodiment, the installation device 136 may include support for metal inserts, wherein the metal inserts may include, but is not limited to, molded-in metal inserts, coil-threaded inserts, thread-cutting inserts, expansion inserts, and the like. In an embodiment, the installation device 136 may include support for snap and press fits. The installation device 136 may also include support for heat welding and sealing such as heat or hot-plate welding, bar sealing, electromagnetic welding, induction welding, spin welding, and the like. Additionally, the installation device 136 may include support for solvent and adhesive bonding. In a non-limited example, nine segments of teeth 116 may be installed on to the inner cylindrical surface of the stator through the support of mechanical fastening using bolt(s) from the installation device 136. In some embodiments, installation device 136 may be further configured to install a second segment of teeth 116 in similar manner, wherein the second segment of teeth 116 may include a single phase. In some cases, second segment of teeth may include multiple phases. In an embodiment, the installation device 136 may be controlled by the computing device described in further detail below.

With continued reference to FIG. 1, installing the plurality of segments 116 of teeth into the stator may further include applying to the stator a polyester-based varnish, and hardening the polyester-based varnish on the stator. As used in this disclosure, a "polyester-based varnish" is the varnish prepared from unsaturated oligoesters, mainly, but not limited to, polymaleinates. The polyester-based varnish may include reactive solvents, such as styrene, which copolymerize with the oligoester when the varnish is applied to a surface, forming an insoluble or irreversible film. In an embodiment, the stator may be submerged into the polyester varnish and right through the polyester varnish, then the stator placed in the oven and heated under certain temperature for a certain duration to harden the polyester varnish on the stator. In some embodiments, installing the plurality of segments of teeth 116 into the stator may include applying to the stator any varnish that will form a moisture resistant surface on the stator.

With continued reference to FIG. 1, the installation device 136 may include a plurality of pins 148. As used in this disclosure, a "pin" is a mechanical element that responsible for establishing a plurality of service loops and preventing the turn-to-turn failure (TTF) in the future. In some embodiments, the end of the pin may be pointed slightly upwards. The angle formed by the pin 148 and the vertical surface of the installation device 136 may be less than 90 degrees. As described herein, a "turn-to-turn failure" is a common electrical fault in electric motor mainly caused by manufacturing and operating. In a non-limited example, the turn-to-turn failure may be developed due to the abrasion of the turn-to-turn insulation, or the relative dislocation caused by the relative motion between the turns in rotor, the turns may contact each other. In another example, the turn-to-turn failure may be developed due to not firming the mounting of rotor end windings (end turns). In some embodiments, the pin 148 may hold the continuous conductor at the center of the service loop. In some embodiments, the pin 148 may hold the continuous conducting coil head.

With continued reference to FIG. 1, in an embodiment, manufacturing a stator for an electric aircraft using the apparatus 100 may include first using the work-holding device 112 of the manufacturing device 104 to hold the first segment of tooth 116. Each tooth 120 within the first segment of teeth 116 may be mechanically affixed to the one part of the work-holding device 112. Then the winding device 124 of the manufacturing device 104 may start the winding process by creating a modular winding set 128 based on the instructions received from the controller/computing device of the manufacturing device 104 once a continuous conductor 132 has been acquired. The work-holding device 112 may rotate about a first axis 144 for the winding device 124 to wind the continuous conducting coil upon a first tooth 120 for a plurality of rounds of the first segment of teeth 116 and rotate about a second axis 140 to move from the first tooth 120 to a second tooth of the first segment of teeth 116. First axis 144 may be also referred to as the "winding axis." Second axis 140 may also be referred to as the "axis of rotation." In some embodiments, first axis 144 may be perpendicular to second axis 140. The rotation about the first axis 144 and/or the second axis 140 may be driven by an actuator. As used in this disclosure, an actuator is a component of the manufacturing device 104 that is responsible for moving and/or controlling a mechanism or system. The actuator or actuators may be communicatively connected to the controller 108, wherein the controller 108 may be configured to command the actuator or actuators to rotate about the first axis 144 and/or the second axis 140. The conducting coil head of the first continuous conducting coil 132 may be captured by the installation device 136 of the manufacturing device 104. The number of modular windings set 128 and rounds may be configured on the controller/computing device. Once the modular winding sets 128 have been created by the winding device 124 and all the conducting coil heads of all the continuous conducting coils have been captured by the plurality of pins 148 of the installation device 136, including all the service loops, the installation device 136 may start the installing process by installing a plurality of segments of teeth 116 onto the stator, wherein the installing a plurality of segments of teeth 116 may further include mechanically fastening the plurality of segments of teeth 116 on to the stator using a plurality of bolts.

With continued reference to FIG. 1, an actuator may include a component of a machine that is responsible for moving and/or controlling a mechanism or system. An actuator may, in some cases, require a control signal and/or a source of energy or power. In some cases, a control signal may be relatively low energy. Exemplary control signal forms include electric potential or current, pneumatic pressure or flow, or hydraulic fluid pressure or flow, mechanical force/torque or velocity, or even human power. In some cases, an actuator may have an energy or power source other than control signal. This may include a main energy source, which may include for example electric power, hydraulic power, pneumatic power, mechanical power, and the like. In some cases, upon receiving a control signal, an actuator responds by converting source power into mechanical motion. In some cases, an actuator may be understood as a form of automation or automatic control.

With continued reference to FIG. 1, in some embodiments, actuator may include a hydraulic actuator. A hydraulic actuator may consist of a cylinder or fluid motor that uses hydraulic power to facilitate mechanical operation. Output of hydraulic actuator may include mechanical motion, such as without limitation linear, rotatory, or oscillatory motion. In some cases, hydraulic actuator may employ a liquid hydraulic fluid. As liquids, in some cases. are incompressible, a hydraulic actuator can exert large forces. Additionally, as force is equal to pressure multiplied by area, hydraulic actuators may act as force transformers with changes in area (e.g., cross sectional area of cylinder and/or piston). An exemplary hydraulic cylinder may consist of a hollow cylindrical tube within which a piston can slide. In some cases, a hydraulic cylinder may be considered single acting. Single acting may be used when fluid pressure is applied substantially to just one side of a piston. Consequently, a single acting piston can move in only one direction. In some cases, a spring may be used to give a single acting piston a return stroke. In some cases, a hydraulic cylinder may be double acting. Double acting may be used when pressure is applied substantially on each side of a piston; any difference in resultant force between the two sides of the piston causes the piston to move.

With continued reference to FIG. 1, in some embodiments, actuator may include a pneumatic actuator. In some cases, a pneumatic actuator may enable considerable forces to be produced from relatively small changes in gas pressure. In some cases, a pneumatic actuator may respond more quickly than other types of actuators, for example hydraulic actuators. A pneumatic actuator may use compressible fluid (e.g., air). In some cases, a pneumatic actuator may operate on compressed air. Operation of hydraulic and/or pneumatic actuators may include control of one or more valves, circuits, fluid pumps, and/or fluid manifolds.

With continued reference to FIG. 1, in some cases, actuator may include an electric actuator. Electric actuator may include any of electromechanical actuators, linear motors, and the like. In some cases, actuator may include an electromechanical actuator. An electromechanical actuator may convert a rotational force of an electric rotary motor into a linear movement to generate a linear movement through a mechanism. Exemplary mechanisms, include rotational to translational motion transformers, such as without limitation a belt, a screw, a crank, a cam, a linkage, a scotch yoke, and the like. In some cases, control of an electromechanical actuator may include control of electric motor, for instance a control signal may control one or more electric motor parameters to control electromechanical actuator. Exemplary non-limitation electric motor parameters include rotational position, input torque, velocity, current, and potential. electric actuator may include a linear motor. Linear motors 228a-b may differ from electromechanical actuators, as power from linear motors is output directly as translational motion, rather than output as rotational motion and converted to translational motion. In some cases, a linear motor may cause lower friction losses than other devices. Linear motors may be further specified into at least 3 different categories, including flat linear motor, U-channel linear motors and tubular linear motors. Linear motors 228a-b may be directly controlled by a control signal for controlling one or more linear motor parameters. Exemplary linear motor parameters include without limitation position, force, velocity, potential, and current.

With continued reference to FIG. 1, in some embodiments, an actuator may include a mechanical actuator. In some cases, a mechanical actuator 228a-b may function to execute movement by converting one kind of motion, such as rotary motion, into another kind, such as linear motion, An exemplary mechanical actuator includes a rack and pinion. In some cases, a mechanical power source, such as a power take off may serve as power source for a mechanical actuator. Mechanical actuators may employ any number of mechanism, including for example without limitation gears, rails, pulleys, cables, linkages, and the like.

Figure 2:
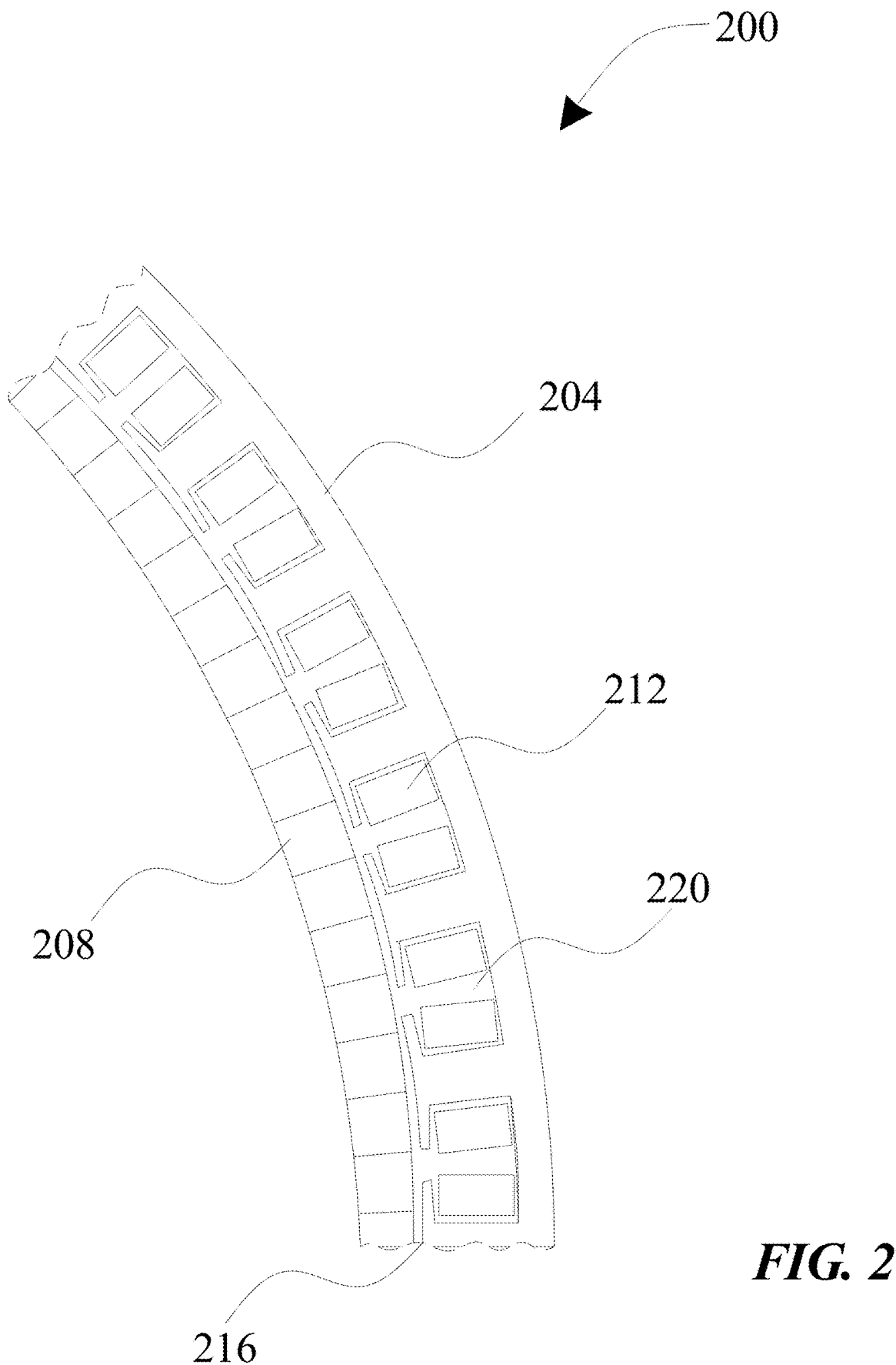
FIG. 2 is a diagram of an exemplary embodiment of a segment of teeth assembly.

Referring now to FIG. 2, a segment of teeth assembly 200 that may be incorporated in a stator used in electric aircraft is presented. Segment of teeth assembly 200 may comprise inner cylindrical surface 204 and outer cylindrical surface 208 that share a coincident and parallel axis of rotation disposed at the center of each cylindrical surface. Inner cylindrical surface 204 and outer cylindrical surface 208 may comprise different radius and thus comprise different sizes. Stator assembly 200 further comprises a hollow cylinder bounded by inner cylindrical surface 204, outer cylindrical surface 208, and a first and second end disposed perpendicularly to axis of rotation of stator opposite and opposing to each other. At least a portion of stator assembly 200 may be mechanically coupled to at least a portion of an electric aircraft. The aircraft will be disclosed with reference to FIG. 4.

With continued reference to FIG. 2, the segment of teeth assembly 200 may further comprise a plurality of teeth 212 disposed on inner cylindrical surface 204. The plurality of teeth 212 extend radially inward toward axis of rotation, but do not intersect with axis of rotation. The plurality of teeth 212 each comprise an inner tooth end with a first width, and an outer tooth end with a second width. The first width is different from the second width. In an embodiment, the first width is smaller than the second width, the plurality of teeth 212 extend radially inward toward axis of rotation, but do not intersect with axis of rotation. In other words, the plurality of teeth 212 each comprise a cross sectional area which increases as each tooth 212 extends further from inner cylindrical surface 204. One of ordinary skill in the art would understand that each tooth 212 may be radially symmetrical about axis of rotation, symmetrical about some other axis, or not symmetrical about any cross section. The plurality of teeth 212 may extend from a first end to a second end of the segment of teeth assembly 200 or a portion thereof.

With continued reference to FIG. 2, the segment of teeth assembly 200 may further include a plurality of modular winding sets 220. Each of the plurality of modular winding sets 220 may include at least a tooth wound by an electrically conductive material 216. The at least a tooth may be wound by the electrically conductive material 216 may comprise a wire, filament, or other suitable material and configuration thereof to conduct electricity through it. In an embodiment, the at least a tooth wound by the electrically conductive material 216 may include a continuous conducting coil. Modular winding sets 220 may further include multiphase windings. Additionally, each of the plurality of modular winding sets 220 may be provided electrical power by an individual inverter. An "inverter," for the purposes of this disclosure, is a power electronic device or circuitry that changes direct current (DC) to alternative current (AC). An inverter (also called a power inverter) can be entirely electronic or may be a combination of mechanical effects (such as a rotary apparatus) and electronic circuitry. Alternatively, static inverters do not use moving parts in the conversion process. Inverters do not produce any power itself, rather it converts power produced by a DC power source. Inverters are often used in electrical power applications where high currents and voltages are present; circuits that perform the same function for electronic signals, which usually have very low currents and voltages, are called oscillators. Circuits that perform the opposite function, converting AC to DC, are called rectifiers.

Referring again to FIG. 2, the at least a tooth 212 may be wound in parallel, or perpendicular to the axis of rotation of the stator. Additionally, the plurality of modular winding sets 220 may comprise a fraction of the stator. Modular winding sets 220 may each include a subset of phases. The segment of teeth assembly 200 may include a regularly disposed amount of modular winding sets. In a non-limiting example, each modular winding set 220 may include one-fourth of the stator.

Stator manufacturing including the segment of teeth assembly 200 manufacturing using apparatus 100 may include a subtractive manufacturing process, which produces the product by removing material from a workpiece; the removal of material may be accomplished using abrasives, cutting tools or endmills, laser cutting or ablation, removal using heat, or any other method that removes material from the workpiece. Subtractive manufacturing may be performed using water-jet or other fluid-jet cutting techniques. Fundamentally, any process for removal of material may be employed for subtractive manufacturing. Each subtractive manufacturing process used may be any suitable process, such as, but not limited to, rotary-tool milling, electronic discharge machining, ablation, etching, erosion, cutting, and cleaving, among others. Additionally, if rotary-tool milling is utilized, this milling may be accomplished using any suitable type of milling equipment, such as milling equipment having either a vertically or horizontally oriented spindle shaft. Examples of milling equipment include bed mills, turret mills, C-frame mills, floor mills, gantry mills, knee mills, and ram-type mills, among others. In some embodiments, the milling equipment used for removing material may be of the computerized numerical control (CNC) type that is automated and operates by precisely programmed commands that control movement of one or more parts of the equipment to affect the material removal. CNC machines, their operation, programming, and relation to CAM tools and CAD tools are well known and need not be described in detail herein for those skilled in the art to understand the scope of the present invention and how to practice it in any of its widely varying forms. Subtractive manufacturing may be performed using spark erosive devices; for instance, subtractive manufacturing may include removal of material using electronic discharge machining (EDM). EDM may include wire EDM, plunge EDM, immersive EDM, ram EDM, or any other EDM manufacturing technique. Subtractive manufacturing may be performed using laser-cutting processes. Subtractive manufacturing may be performed using waterjet or other fluid jet cutting techniques. Fundamentally, any process for removal of material may be employed for subtractive manufacturing.

Stator manufacturing including the segment of teeth assembly 200 manufacturing using apparatus 100 may also include an additive manufacturing process, in which material is deposited on the workpiece. In some embodiments, an additive manufacturing process is a process in which material is added incrementally to a body of material in a series of two or more successive steps. The material may be added in the form of a stack of incremental layers; each layer may represent a cross-section of the object to be formed upon completion of the additive manufacturing process. Each cross-section may, as a non-limiting example be modeled on a computing device as a cross-section of graphical representation of the object to be formed; for instance, a computer aided design (CAD) tool may be used to receive or generate a three-dimensional model of the object to be formed, and a computerized process may derive from that model a series of cross-sectional layers that, when deposited during the additive manufacturing process, together will form the object. The steps performed by an additive manufacturing system to deposit each layer may be guided by a computer aided manufacturing (CAM) tool. In other embodiments, a series of layers are deposited in a substantially radial form, for instance by adding a succession of coatings to the workpiece. Similarly, the material may be added in volumetric increments other than layers, such as by depositing physical voxels in rectilinear or other forms. Additive manufacturing, as used in this disclosure, may specifically include manufacturing done at the atomic and nano level. Additive manufacturing also includes bodies of material that are a hybrid of other types of manufacturing processes, e.g., forging and additive manufacturing as described above. As an example, a forged body of material may have welded material deposited upon it which then comprises an additive manufactured body of material.

Deposition of material in additive manufacturing process may be accomplished by any suitable means. Deposition may be accomplished using stereolithography, in which successive layers of polymer material are deposited and then caused to bind with previous layers using a curing process such as curing using ultraviolet light. Additive manufacturing processes may include "three-dimensional printing" processes that deposit successive layers of power and binder; the powder may include polymer or ceramic powder, and the binder may cause the powder to adhere, fuse, or otherwise join into a layer of material making up the body of material or product. Additive manufacturing may include metal three-dimensional printing techniques such as laser sintering including direct metal laser sintering (DMLS) or laser powder-bed fusion. Likewise, additive manufacturing may be accomplished by immersion in a solution that deposits layers of material on the body of material, by depositing and sintering materials having melting points such as metals, such as selective laser sintering, by applying fluid or paste-like materials in strips or sheets and then curing that material either by cooling, ultraviolet curing, and the like, any combination of the above methods, or any additional methods that involve depositing successive layers or other increments of material. Methods of additive manufacturing may include without limitation vat polymerization, material jetting, binder jetting, material extrusion, fuse deposition modeling, powder bed fusion, sheet lamination, and directed energy deposition. Methods of additive manufacturing may include adding material in increments of individual atoms, molecules, or other particles. An additive manufacturing process may use a single method of additive manufacturing or combine two or more methods. Companies producing additive manufacturing equipment include 3D Systems, Stratasys, formLabs, Carbon3D, Solidscape, voxeljet, ExOne, envisiontec, SLM Solutions, Arcam, EOS, Concept Laser, Renishaw, XJET, HP, Desktop Metal, Trumpf, Mcor, Optomec, Sciaky, and MarkForged amongst others.

Additive manufacturing may include deposition of initial layers on a substrate. Substrate may include, without limitation, a support surface of an additive manufacturing device, or a removable item placed thereon. Substrate may include a base plate, which may be constructed of any suitable material; in some embodiments, where metal additive manufacturing is used, base plate may be constructed of metal, such as titanium. Base plate may be removable. One or more support features may also be used to support additively manufactured body of material during additive manufacture; for instance and without limitation, where a downward facing surface of additively manufactured body of material is constructed having less than a threshold angle of steepness, support structures may be necessary to support the downward-facing surface; threshold angle may be, for instance 45 degrees. Support structures may be additively constructed and may be supported on support surface and/or on upward-facing surfaces of additively manufactured body of material. Support structures may have any suitable form, including struts, buttresses, mesh, honeycomb or the like; persons skilled in the art, upon reviewing the entirety of this disclosure, will be aware of various forms that support structures may take consistently with the described methods and systems.

One or more manufacturing processes may include a molding and/or injection molding manufacturing process. Molding and/or injection manufacturing may include deposition of a fluid material which may include, without limitation, a molten material, into a mold, cast, die, or any other suitable form. Deposition of a molten material for molding manufacturing may include carbon fiber, ceramics, confections, elastomers, epoxies, glasses, metals, plastics, photopolymers, polymers, resins, rubbers, amongst other suitable materials. Fluid materials, including without limitation molten materials, may be injected into the cavity of a mold and/or die, made of steel, aluminum, beryllium-copper, amongst other materials, until cooled and/or formed; forming may include without limitation any process of solidifying, curing, or thickening fluids into an elastomeric, solid, or other suitable state by processing including without limitation cooling or allowing material to be cooled and/or undergo a phase change and/or any other process of curing materials as described above in additive manufacturing. Manufacturing to produce molds may be performed by standard machining, electric discharge machining (EDM), 3D printing, spark erosion, CNC machining, or any other suitable manufacturing method. Molds may be additively manufactured, subtractively manufactured, machined, or 3D printed. Injection of molten material may be performed by die casting, metal injection molding, thin-wall injection molding, injection molding, 3D printing, reaction injection molding, or any other suitable method. Persons skilled in the art, upon reviewing the entirety of this disclosure, will be aware of various forms that molding and/or injection molding manufacturing may take consistently with the described methods and systems.

Figure 3:
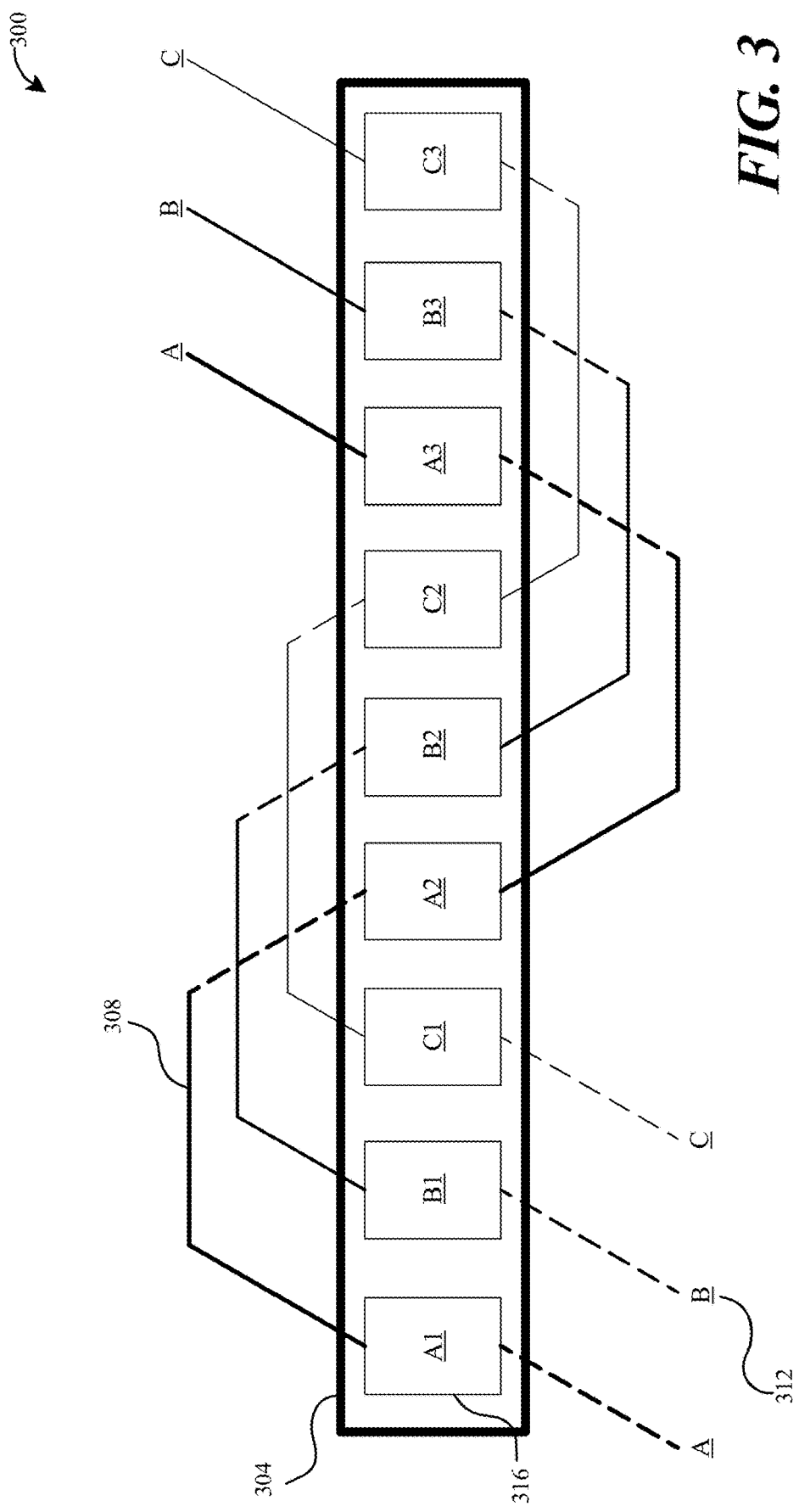
FIG. 3 is a diagram of an exemplary embodiment of a multiphase winding.

Referring now to FIG. 3, a schematic diagram illustrates a multiphase winding 300 on a segment of teeth 304. The segment of teeth 304 may contains three modular winding set 312 denoted as A, B, and C. The segment of teeth 304 also may also contains nine teeth 316. The multiphase winding may include the plurality of teeth in each modular winding set using a continuous conducting coil 308. The multiphase winding 300 may include a first phase/modular winding set A that may traverse and wind a first set of teeth, wherein the first set of teeth includes teeth A1, A2, and A3, from the start of the segment of teeth 304 to the end of the segment of teeth 304. The multiphase winding 300 may include a second phase/modular winding set B that may traverse and wind a second set of teeth, wherein the second set of teeth includes teeth B1, B2, and B3, from the start of the segment of teeth 304 to the end of segment of teeth 304. The multiphase winding 300 may include a third phase/modular winding set C that may traverse and wind a third set of teeth, wherein the third set of teeth includes teeth C1, C2, and C3, from the start of the segment of teeth 304 to the end of segment of teeth 304. The segment of teeth 304 may connect with a second segment of teeth by connecting the continuous conducting coil of phase A from the segment of teeth 304 with the continuous conducting coil of phase A from the second segment of teeth, the continuous conducting coil of phase B from the segment of teeth 304 with the continuous conducting coil of phase B from the second segment of teeth, and the continuous conducting coil of phase C from the segment of teeth 304 with the continuous conducting coil of phase C from the second segment of teeth. Alternatively, or additionally, there may be a single phase, or any number of electrically isolated phases for the multiphase winding 300. In non-limiting illustrative embodiments, each winding may be connected to at least its own inverter.

Figure 4:
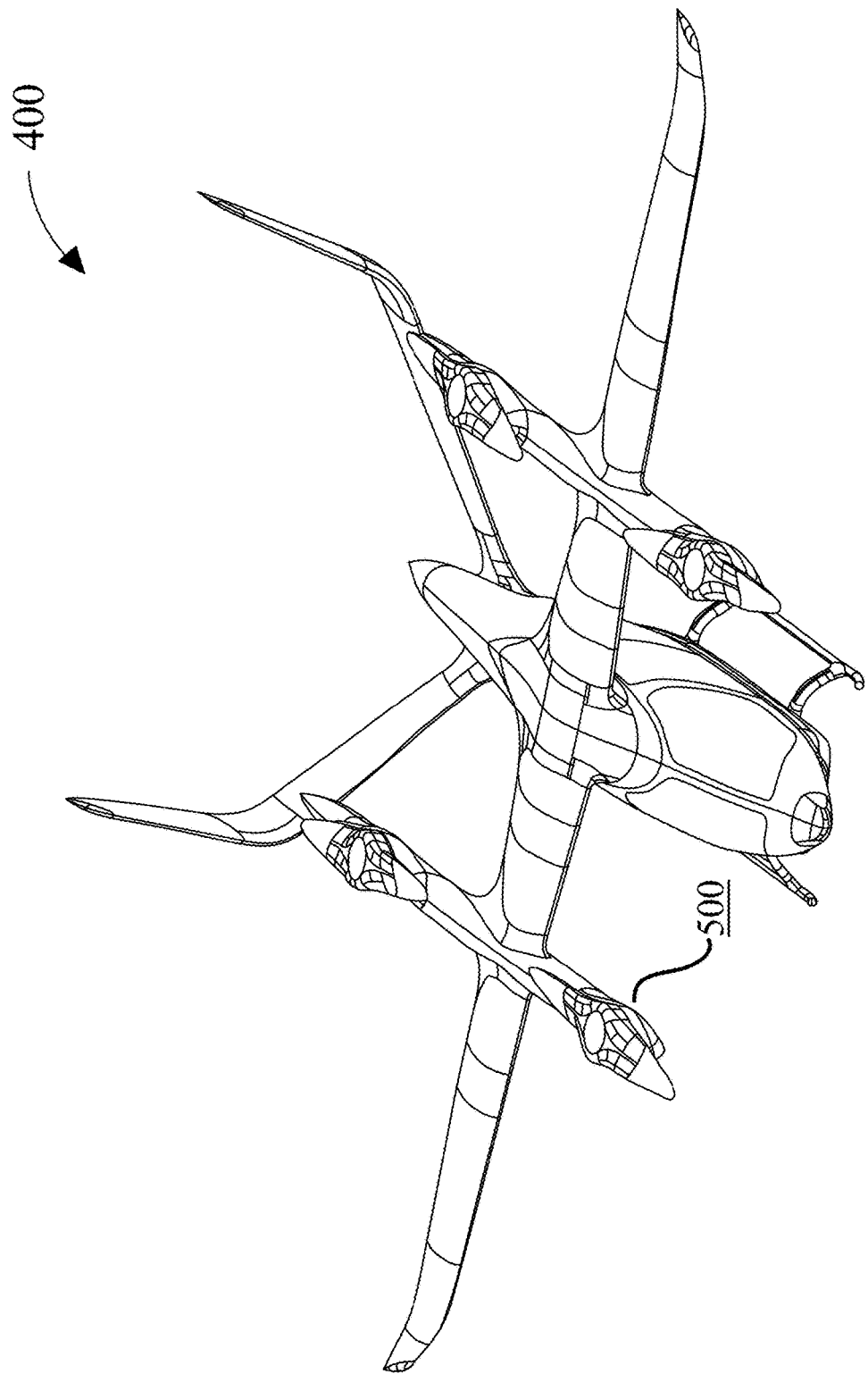
FIG. 4 is a diagram of an exemplary embodiment of an electric aircraft.

Now referring to FIG. 4, an exemplary electric aircraft 400 is shown. Electric aircraft 400 may include a motor, such as electric motor 500 which will be disclosed in further detail below, is illustrated. Electric aircraft 400 may include electric motor 500 may be mounted on a structural feature of an aircraft. Design of electric motor 500 may enable it to be installed external to the structural member (such as a boom, nacelle, or fuselage) for easy maintenance access and to minimize accessibility requirements for the structure. This may improve structural efficiency by requiring fewer large holes in the mounting area. This design may include two main holes in the top and bottom of the mounting area to access bearing cartridge. Further, a structural feature may include a component of electric aircraft 400. For example, and without limitation structural feature may be any portion of a vehicle incorporating electric motor 500, including any vehicle as described below. As a further non-limiting example, a structural feature may include without limitation a wing, a spar, an outrigger, a fuselage, or any portion thereof; persons skilled in the art, upon reviewing the entirety of this disclosure, will be aware of many possible features that may function as at least a structural feature. At least a structural feature may be constructed of any suitable material or combination of materials, including without limitation metal such as aluminum, titanium, steel, or the like, polymer materials or composites, fiberglass, carbon fiber, wood, or any other suitable material. As a non-limiting example, at least a structural feature may be constructed from additively manufactured polymer material with a carbon fiber exterior; aluminum parts or other elements may be enclosed for structural strength, or for purposes of supporting, for instance, vibration, torque or shear stresses imposed by at least propulsor 512. Persons skilled in the art, upon reviewing the entirety of this disclosure, will be aware of various materials, combinations of materials, and/or constructions techniques.

With continued reference to FIG. 4, an electric aircraft 400 may include a vertical takeoff and landing aircraft (eVTOL). As used herein, a "vertical take-off and landing (eVTOL) aircraft" is one that can hover, take off, and land vertically. An eVTOL, as used herein, is an electrically powered aircraft typically using an energy source, of a plurality of energy sources to power the aircraft. In order to optimize the power and energy necessary to propel the aircraft. eVTOL may be capable of rotor-based cruising flight, rotor-based takeoff, rotor-based landing, fixed-wing cruising flight, airplane-style takeoff, airplane-style landing, and/or any combination thereof. "Rotor-based flight", as described herein, is where the aircraft generated lift and propulsion by way of one or more powered rotors coupled with an engine, such as a "quad copter," multi-rotor helicopter, or other vehicle that maintains its lift primarily using downward thrusting propulsors. Fixed-wing flight, as described herein, is where the aircraft is capable of flight using wings and/or foils that generate life caused by the aircraft's forward airspeed and the shape of the wings and/or foils, such as airplane-style flight.

With continued reference to FIG. 4, a number of aerodynamic forces may act upon the electric aircraft 400 during flight. Forces acting on an electric aircraft 400 during flight may include, without limitation, thrust, the forward force produced by the rotating element of the electric aircraft 400 and acts parallel to the longitudinal axis. Another force acting upon electric aircraft 400 may be, without limitation, drag, which may be defined as a rearward retarding force which is caused by disruption of airflow by any protruding surface of the electric aircraft 400 such as, without limitation, the wing, rotor, and fuselage. Drag may oppose thrust and acts rearward parallel to the relative wind. A further force acting upon electric aircraft 400 may include, without limitation, weight, which may include a combined load of the electric aircraft 400 itself, crew, baggage, and/or fuel. Weight may pull electric aircraft 400 downward due to the force of gravity. An additional force acting on electric aircraft 400 may include, without limitation, lift, which may act to oppose the downward force of weight and may be produced by the dynamic effect of air acting on the airfoil and/or downward thrust from the propulsor of the electric aircraft. Lift generated by the airfoil may depend on speed of airflow, density of air, total area of an airfoil and/or segment thereof, and/or an angle of attack between air and the airfoil. For example, and without limitation, electric aircraft 400 are designed to be as lightweight as possible. Reducing the weight of the aircraft and designing to reduce the number of components is essential to optimize the weight. To save energy, it may be useful to reduce weight of components of an electric aircraft 400, including without limitation propulsors and/or propulsion assemblies. In an embodiment, electric motor 500 may eliminate need for many external structural features that otherwise might be needed to join one component to another component. Electric motor 500 may also increase energy efficiency by enabling a lower physical propulsor profile, reducing drag and/or wind resistance. This may also increase durability by lessening the extent to which drag and/or wind resistance add to forces acting on electric aircraft 400 and/or propulsors.

Figure 5:
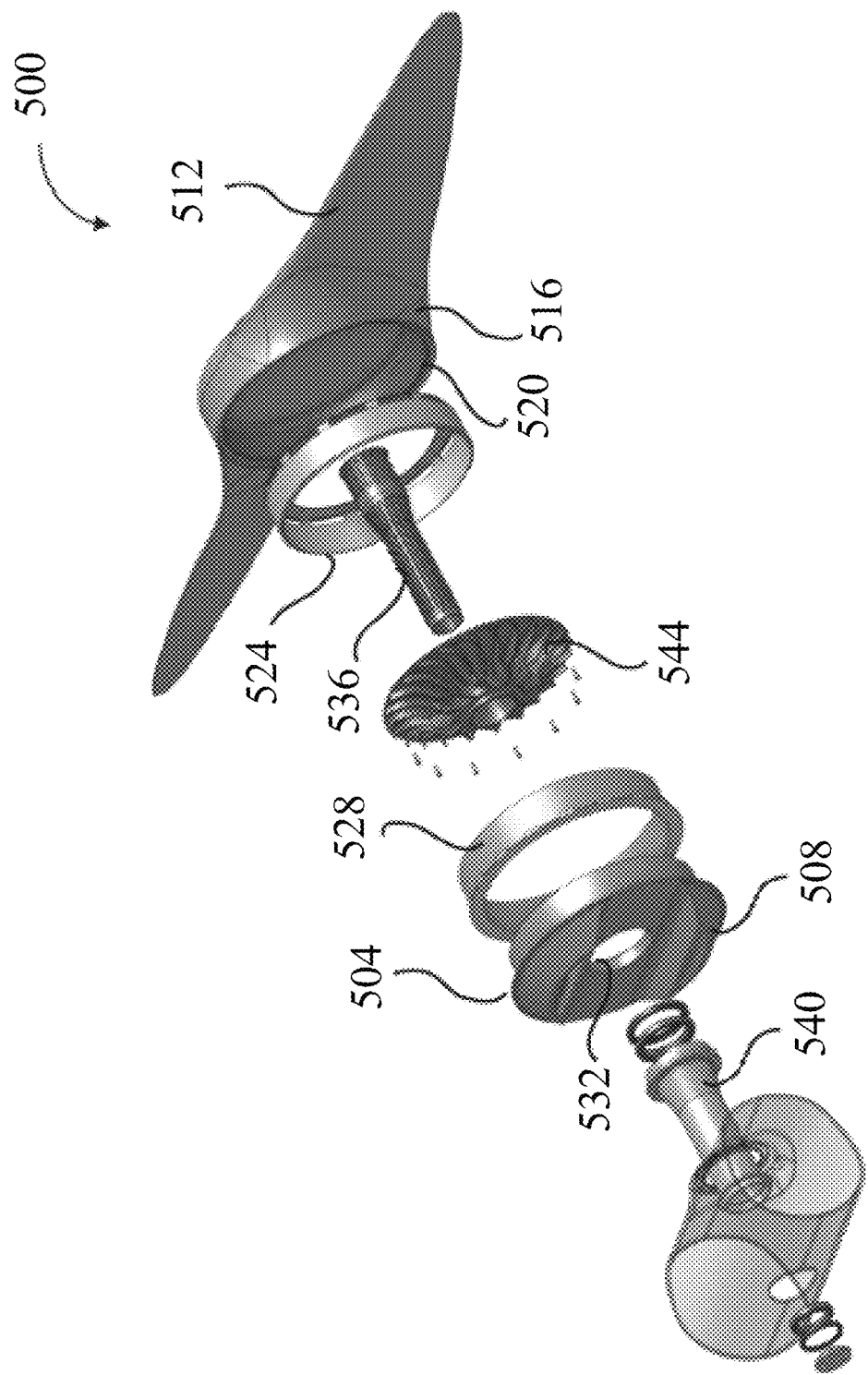
FIG. 5 is an illustration of an exploded view of an electric motor in a propulsion assembly.

Referring now to FIG. 5, an embodiment of electric motor 500 in the electric aircraft 400 is illustrated in an exploded view. Electric motor 500 may include at least a stator 504. In an embodiment, stator 504 may include at least first magnetic element 508. As used herein, "first magnetic element 508" is an element that generates a magnetic field. For example, first magnetic element 508 may include one or more magnets which may be assembled in rows along a structural casing component. Further, first magnetic element 508 may include one or more magnets having magnetic poles oriented in at least a first direction. The magnets may include at least a permanent magnet. Permanent magnets may be composed of, but are not limited to, ceramic, alnico, samarium cobalt, neodymium iron boron materials, any rare earth magnets, and the like. Further, the magnets may include an electromagnet. As used herein, an "electromagnet" is an electrical component that generates magnetic field via induction; the electromagnet may include a coil of electrically conducting material, through which an electric current flow to generate the magnetic field, also called a field coil of field winding. A coil may be wound around a magnetic core, which may include without limitation an iron core or other magnetic material. The core may include a plurality of steel rings insulated from one another and then laminated together; the steel rings may include slots in which the conducting wire will wrap around to form a coil. First magnetic element 508 may act to produce or generate a magnetic field to cause other magnetic elements to rotate, as described in further detail below. Stator 504 may include a frame to house components including first magnetic element 508, as well as one or more other elements or components as described in further detail below. In an embodiment, a magnetic field may be generated by first magnetic element 508 and can include a variable magnetic field. In embodiments, a variable magnetic field may be achieved by use of an inverter, a controller, or the like.

Still referring to FIG. 5, Electric motor 500 may include propulsor 512. In embodiments, propulsor 512 may include an integrated rotor. A "propulsor," as used herein, is a component or device used to propel a craft by exerting force on a fluid medium, which may include a gaseous medium such as air or a liquid medium such as water. Propulsor 512 may be any device or component that consumes electrical power on demand to propel an aircraft or other vehicle while on ground and/or in flight. Propulsor 512 may include one or more propulsive devices. In an embodiment, propulsor 512 may include a thrust element which may be integrated into the propulsor. A thrust element may include any device or component that converts the mechanical energy of a motor, for instance in the form of rotational motion of a shaft, into thrust in a fluid medium. For example, a thrust element may include without limitation a marine propeller or screw, an impeller, a turbine, a pump-jet, a paddle or paddle-based device, or the like. As another non-limiting example, at least a propulsor may include an eight-bladed pusher propeller, such as an eight-bladed propeller mounted behind the engine to ensure the drive shaft is in compression. Persons skilled in the art, upon reviewing the entirety of this disclosure, will be aware of various devices that may be used as at least a thrust element. As used herein, a propulsive device may include, without limitation, a device using moving or rotating foils, including without limitation one or more rotors, an airscrew or propeller, a set of airscrews or propellers such as contra-rotating propellers, a moving or flapping wing, or the like. In an embodiment, propulsor 512 may include at least a blade. Persons skilled in the art, upon reviewing the entirety of this disclosure, will be aware of various devices that may be used as propulsor 512. In an embodiment, when a propulsor twists and pulls air behind it, it will, at the same time, push the aircraft forward with an equal amount of force. The more air pulled behind the aircraft, the more the aircraft is pushed forward. In an embodiment, thrust element may include a helicopter rotor incorporated into propulsor 512. A helicopter rotor, as used herein, may include one or more blade or wing elements driven in a rotary motion to drive fluid medium in a direction axial to the rotation of the blade or wing element. Its rotation is due to the interaction between the windings and magnetic fields which produces a torque around the rotor's axis. A helicopter rotor may include a plurality of blade or wing elements.

Continuing to refer to FIG. 5, in an embodiment, propulsor 512 may include hub 516 rotatably mounted to stator 504. "Rotatably mounted," as described herein, is functionally secured in a manner to allow rotation. Hub 516 is a structure which allows for the mechanically coupling of components of the integrated rotor assembly. In an embodiment, hub 516 can be mechanically coupled to propellers or blades. In an embodiment, hub 516 may be cylindrical in shape such that it may be mechanically joined to other components of the rotor assembly. Hub 516 may be constructed of any suitable material or combination of materials, including without limitation metal such as aluminum, titanium, steel, or the like, polymer materials or composites, fiberglass, carbon fiber, wood, or any other suitable material. Hub 516 may move in a rotational manner driven by interaction between stator and components in the rotor assembly. Persons skilled in the art, upon reviewing the entirety of this disclosure, will be aware of various structures that may be used as or included as hub 516, as used and described herein.

Still referring to FIG. 5, in an embodiment, propulsor 512 and/or rotor shaft 536 may include second magnetic element 520, which may include one or more further magnetic elements. Second magnetic element 520 generates a magnetic field designed to interact with first magnetic element 508. Second magnetic element 520 may be designed with a material such that the magnetic poles of at least a second magnetic element are oriented in an opposite direction from first magnetic element 508. In an embodiment, second magnetic element 520 may be affixed to hub 516, rotor shaft 536, or another rotating or stationary electric motor component disclosed herein. Affixed, as described herein, is the attachment, fastening, connection, and the like, of one component to another component. For example, and without limitation, affixed may include bonding the second magnetic element 520 to hub 516, such as through hardware assembly, spot welding, riveting, brazing, soldering, glue, and the like. Second magnetic element 520 may include any magnetic element suitable for use as first magnetic element 508. For instance, and without limitation, second magnetic element may include a permanent magnet and/or an electromagnet. Second magnetic element 520 may include magnetic poles oriented in a second direction opposite, in whole or in part, of the orientation of the poles of first magnetic element 508. In an embodiment, Electric motor 500 may include a motor assembly incorporating stator 504 with a first magnet element and second magnetic element 520. First magnetic element 508 may include magnetic poles oriented in a first direction, a second magnetic element includes a plurality of magnetic poles oriented in the opposite direction than the plurality of magnetic poles in the first magnetic element 508.

Referring again to FIG. 5, in an embodiment, first magnetic element 508 may be a productive element, defined herein as an element that produces a varying magnetic field. Productive elements may produce magnetic field that may attract and other magnetic elements, possibly including a receptive element. Second magnetic element may be a productive or receptive element. A receptive element may react due to the magnetic field of first magnetic element 508. In an embodiment, first magnetic element 508 may produce a magnetic field according to magnetic poles of first magnetic element 508 oriented in a first direction. Second magnetic element 520 may produce a magnetic field with magnetic poles in the opposite direction of the first magnetic field, which may cause the two magnetic elements to attract one another. Receptive magnetic element may be slightly larger in diameter than the productive element. Interaction of productive and receptive magnetic elements may produce torque and cause the assembly to rotate. Hub 516 and rotor assembly may both be cylindrical in shape where rotor may have a slightly smaller circumference than hub 516 to allow the joining of both structures. Coupling of hub 516 to stator 504 may be accomplished via a surface modification of either hub 516, stator 504 or both to form a locking mechanism. Coupling may be accomplished using additional nuts, bolts, and/or other fastening apparatuses. In an embodiment, an integrated rotor assembly as described above may reduce profile drag in forward flight for an electric aircraft. Profile drag may be caused by a number of external forces that the aircraft is subjected to. In an embodiment, incorporating propulsor 512 into hub 516, may reduce a profile of Electric motor 500 resulting in a reduced profile drag. In an embodiment, the rotor, which may include motor inner magnet carrier 524, motor outer magnet carrier 528, propulsor 512 may be incorporated into hub 516. In an embodiment, inner motor magnet carrier 524 may rotate in response to a magnetic field. The rotation may cause hub 516 to rotate. This unit may be inserted into Electric motor 500 as one unit. This may enable ease of installation, maintenance, and removal.

Still referring to FIG. 5, stator 504 may include through-hole 532. Through-hole 532 may provide an opening for a component to be inserted through to aid in attaching propulsor with integrated rotor and rotor shaft to stator. In an embodiment, through-hole 532 may have a round or cylindrical shape and be located at a rotational axis of stator 504, which in an embodiment may be similar to or the same as axis of rotation 512. Hub 516 may be mounted to stator 504 by means of rotor shaft 536 rotatably inserted though through-hole 532. The rotor shaft 536 may be mechanically coupled to stator 504 such that rotor shaft 536 is free to rotate about its centerline axis, which may be effectively parallel and coincident to stator's centerline axis, and further the rotor shaft and stator may include a void of empty space between them, where at least a portion the outer cylindrical surface of the rotor shaft is not physically contacting at least a portion of the inner cylindrical surface of the stator. This void may be filled, in whole or in part, by air, a vacuum, a partial vacuum or other gas or combination of gaseous elements and/or compounds, to name a few. Through-hole 532 may have a diameter that is slightly larger than a diameter of rotor shaft 536 to allow rotor shaft 536 to fit through through-hole 532 to connect stator 504 to hub 516. Rotor shaft 536 may rotate in response to rotation of propulsor 512.

Still referring to FIG. 5, Electric motor 500 may include a bearing cartridge 540. Bearing cartridge 540 may include a bore. Rotor shaft 536 may be inserted through the bore of bearing cartridge 540. Bearing cartridge 540 may be attached to a structural element of a vehicle. Bearing cartridge 540 functions to support the rotor and to transfer the loads from the motor. Loads may include, without limitation, weight, power, magnetic pull, pitch errors, out of balance situations, and the like. Bearing cartridge 540 may include a bore. Bearing cartridge 540 may include a smooth metal ball or roller that rolls against a smooth inner and outer metal surface. The rollers or balls take the load, allowing the device to spin. a bearing may include, without limitation, a ball bearing, a straight roller bearing, a tapered roller bearing or the like. Bearing cartridge 540 may be subject to a load which may include, without limitation, a radial or a thrust load. Depending on the location of bearing cartridge 540 in the assembly, it may see all of a radial or thrust load or a combination of both. In an embodiment, bearing cartridge 540 may join Electric motor 500 to a structure feature. Bearing cartridge 540 may function to minimize the structural impact from the transfer of bearing loads during flight and/or to increase energy efficiency and power of propulsor. Bearing cartridge 540 may include a shaft and collar arrangement, wherein a shaft affixed into a collar assembly. A bearing element may support the two joined structures by reducing transmission of vibration from such bearings. Roller (rolling-contact) bearings are conventionally used for locating and supporting machine parts such as rotors or rotating shafts. Typically, the rolling elements of a roller bearing are balls or rollers. In general, a roller bearing is a is type of anti-friction bearing; a roller bearing functions to reduce friction allowing free rotation. Also, a roller bearing may act to transfer loads between rotating and stationary members. In an embodiment, bearing cartridge 540 may act to keep propulsor 512 and components intact during flight by allowing Electric motor 500 to rotate freely while resisting loads such as an axial force. In an embodiment, bearing cartridge 540 may include a roller bearing incorporated into the bore. a roller bearing is in contact with rotor shaft 536. Stator 504 may be mechanically coupled to inverter housing. Mechanically coupled may include a mechanical fastening, without limitation, such as nuts, bolts or other fastening device. Mechanically coupled may include welding or casting or the like. Inverter housing may contain a bore which allows insertion by rotor shaft 536 into bearing cartridge 540.

Still referring to FIG. 5, Electric motor 500 may include a motor assembly incorporating a rotating assembly and a stationary assembly. Hub 516, motor inner magnet carrier 524 and rotor shaft 536 may be incorporated into the rotor assembly of Electric motor 500 which make up rotating parts of electric motor, moving between the stator poles and transmitting the motor power. As one integrated part, the rotor assembly may be inserted and removed in one piece. Stator 504 may be incorporated into the stationary part of the motor assembly. Stator and rotor may combine to form an electric motor. In embodiment, an electric motor may, for instance, incorporate coils of wire, which may be similar to or the same as any of the electrically conductive components in the entirety of this disclosure, which are driven by the magnetic force exerted by a first magnetic field on an electric current. The function of the motor may be to convert electrical energy into mechanical energy. In operation, a wire carrying current may create at least a first magnetic field with magnetic poles in a first orientation which interacts with a second magnetic field with magnetic poles oriented in the opposite direction of the first magnetic pole direction causing a force that may move a rotor in a direction. For example, and without limitation, first magnetic element 508 in Electric motor 500 may include an active magnet. For instance, and without limitation, a second magnetic element may include a passive magnet, a magnet that reacts to a magnetic force generated by first magnetic element 508. In an embodiment, a first magnet positioned around the rotor assembly, may generate magnetic fields to affect the position of the rotor relative to the stator 504. A controller may have an ability to adjust electricity originating from a power supply and, thereby, the magnetic forces generated, to ensure stable rotation of the rotor, independent of the forces induced by the machinery process.

Electric motor 500 may include impeller 544 coupled with the rotor shaft 536. An impeller, as described herein, is a rotor used to increase or decrease the pressure and flow of a fluid, including at least air. Impeller 544 may function to provide cooling to Electric motor 500. Impeller 544 may include varying blade configurations, such as radial blades, non-radial blades, semi-circular blades and airfoil blades. Impeller 544 may further include single and/or double-sided configurations. Impeller 544 is described in further detail below. Additionally, or alternatively, in a non-limiting illustrative example, rotor shaft 536 may be mechanically coupled to cooling vanes. Cooling vanes are used to lower the temperature of a high-velocity mechanical part, like the rotor in an electrical motor. Cooling vanes may employ a plurality of physical principles to cool mechanical parts. Cooling vanes may draw cool air like a fan if mechanically coupled to the rotor at an angle sufficient to create a pressure differential in order to draw cool air from outside the motor housing into the relatively hot inner motor and cool internal mechanical parts by convection. The cooling vanes may alternatively, or additionally cool other components disclosed herein with the impeller. Convection cooling in principle, is cooling of a portion of a body by moving a fluid over it, the tendency of heat energy to move from high to low energy areas, like a hot spinning rotor to cool moving air. Additionally, cooling vanes may act as thermodynamic fins. Heat energy may be conducted through the cooling vanes from the hot rotor shaft to the tips of the cooling vanes, thus dissipating heat in a high-speed rotating part. Cooling vanes may be consistent with those disclosed in U.S. patent application Ser. No. 16/910,255 entitled "Integrated Electric Propulsion Assembly" and incorporated herein by reference in its entirety.

Figure 6:
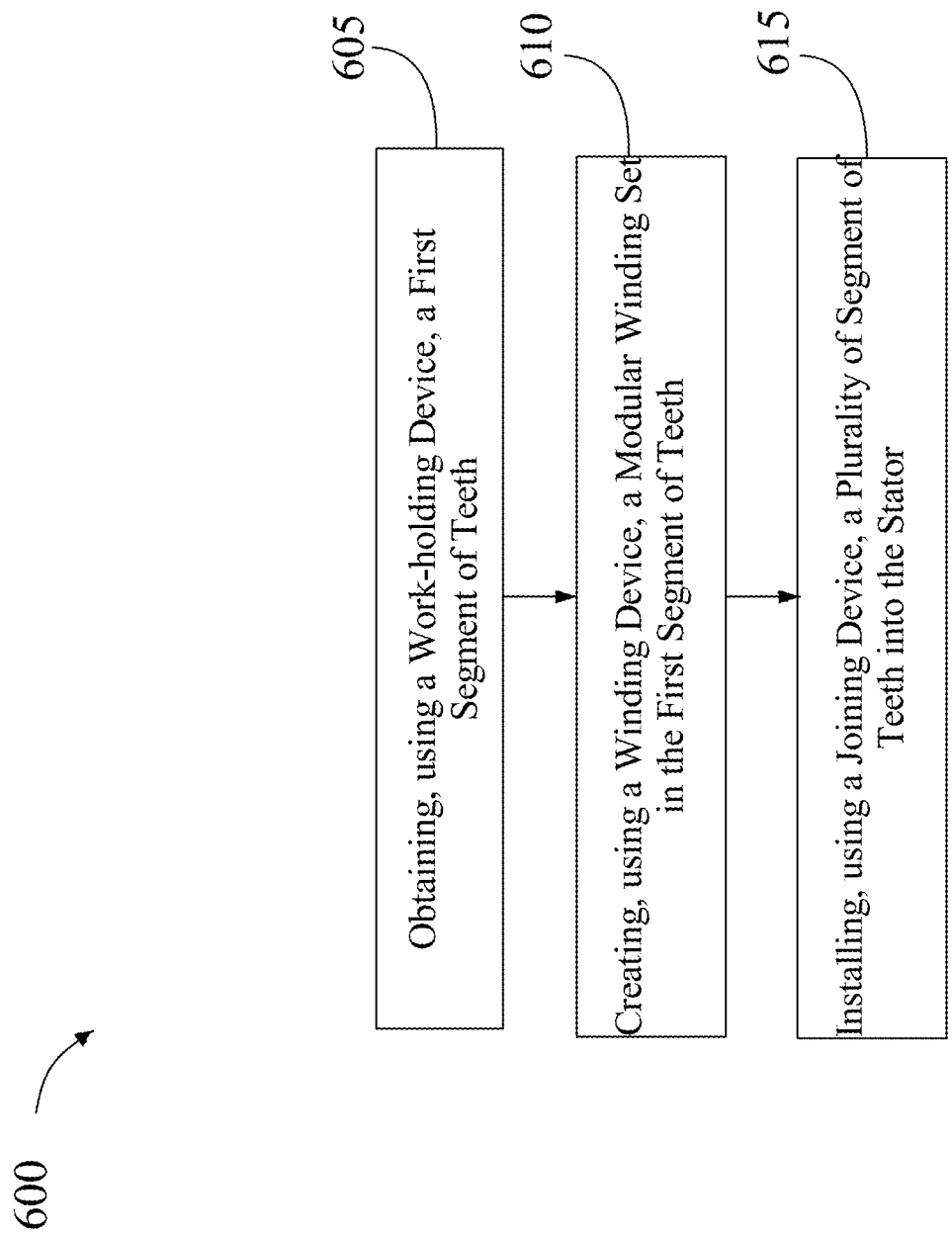
FIG. 6 is flow diagram of an exemplary method of manufacturing a stator for electric aircraft motor.

Referring now to FIG. 6, an exemplary method 600 for manufacturing stator for an electric aircraft is illustrated. Method 600 includes a step 605, of obtaining, using a work-holding device, a first segment of teeth, without limitation, as described above in reference to FIGS. 1-5. In some embodiments, the first segment of teeth may contain a plurality of teeth, wherein each tooth of the plurality of teeth further includes an inner tooth end with a first width, and an outer tooth end with a second width, and the first width is different than the second width. Additionally, the step 605 of obtaining the first segment of teeth may include insulating the tooth body (the area between the inner tooth end and the outer tooth end) in the first segment of teeth using insulation material. This may be implemented, without limitation, as described above with reference to FIGS. 1-5.

With continued reference to FIG. 6, method 600 includes a step 610 of creating, using at least a winding device, a modular winding set in the first segment of teeth. This may be implemented, without limitation, as described above with reference to FIGS. 1-5. The step 610 of creating the modular winding set further include acquiring a continuous conductor and winding a continuous conducting coil upon each tooth of the plurality of teeth using the continuous conductor, thereby creating a winding for each tooth. In some embodiments, the continuous conductor may include a continuous multi-stranded wire. In some embodiment, winding the continuous conducting coil may include winding the continuous conductor about a winding axis that is perpendicular to the axis of rotation of work-holding device. In some embodiments, winding the continuous conducting coil may include a plurality of multiphase windings. This may be implemented, without limitation, as described above with reference to FIGS. 1-5. In some embodiments, winding the continuous conductor may further include attaching the continuous conductor to the tooth using heat and/or chemical resistant cord, without limitation, as described above in reference to FIGS. 1-5.

With continued reference to FIG. 6, method 600 includes a step 615 of installing, using at least an installation device, a plurality of segment of teeth into the stator. This may be implemented, without limitation, as described above with reference to FIGS. 1-5. In some embodiments, the installation device may include a plurality of pins. In some embodiments, installing the plurality of segment of teeth into the stator further include applying to the stator a polyester-based varnish and hardening the polyester-based varnish on the stator. This may be implemented without limitation, as described above with reference to FIGS. 1-5.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
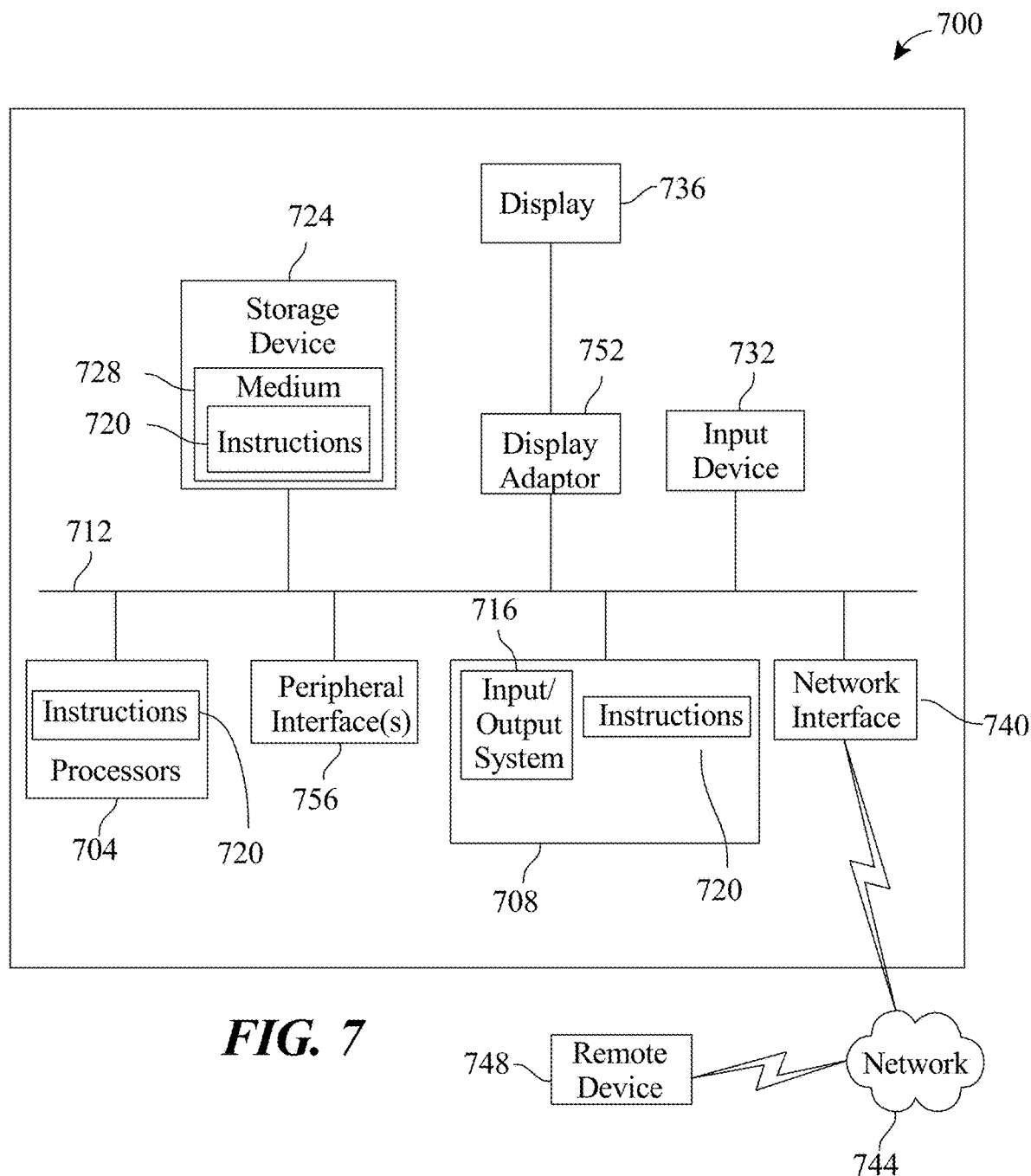
FIG. 7 is a block diagram of a computing system that can be used to implement any one or more of the methodologies disclosed herein and any one or more portions thereof.

FIG. 7 shows a diagrammatic representation of one embodiment of a computing device in the exemplary form of a computer system 700 within which a set of instructions for causing a control system, such as the integrated electric propulsion assembly 500 system of FIG. 5, to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 794 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIREWIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve embodiments according to this disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for manufacturing a stator for an electric aircraft, the apparatus comprising:
    at least a work-holding device configured to hold a plurality of teeth corresponding to a complete electrical phase of a stator winding; and
    at least a winding device configured to dispense a continuous length of a multi-stranded conducting wire, wherein the work-holding device is configured to rotate about a first axis to select one of the plurality of teeth for winding the multi-stranded conducting wire about the one of the plurality of teeth, and the work holding device is configured to rotate about a second axis that is perpendicular to the first axis to wind the multi-stranded conducting wire about the one of the plurality of teeth.

2. The apparatus of claim 1, wherein the plurality of teeth comprise:
    an inner tooth end and an outer tooth end, wherein the inner tooth end has a first width, and the outer tooth end has a second width; and
    the first width is different from the second width.

3. The apparatus of claim 1, wherein holding the plurality of teeth further comprises:
    insulating an area in between an inner tooth end and an outer tooth end of each tooth.

4. The apparatus of claim 1, further comprising a manufacturing device configured to create at least a service loop of a predetermined length between adjacent teeth.

5. The apparatus of claim 1, further comprising a modular winding set comprising a single phase.

6. The apparatus of claim 1, wherein winding the continuous length of multi-stranded conducting wire comprises:

attaching the continuous length of multi-stranded conducting wire to a tooth using heat resistant cord.

7. The apparatus of claim 1, further comprising installing the plurality of teeth into the stator by:
applying to the stator a polyester-based varnish; and
hardening the polyester-based varnish on the stator.

8. The apparatus of claim 7, wherein installing the plurality of teeth further comprises installing a second segment of teeth, wherein the second segment of teeth comprises a single phase.

9. A method for manufacturing a stator for an electric aircraft, wherein the method comprises:
holding, using a work-holding device, a plurality of teeth corresponding to a complete electrical phase of a stator winding; and
dispensing, using a winding device, a continuous length of a multi-stranded conducting wire, wherein the work-holding device is configured to rotate about a first axis to select one of the plurality of teeth for winding the multi-stranded conducting wire about the one of the plurality of teeth, and the work holding device is configured to rotate about a second axis that is perpendicular to the first axis to wind the multi-stranded conducting wire about the one of the plurality of teeth.

10. The method of claim 9, wherein the plurality of teeth comprise:
an inner tooth end and an outer tooth end, wherein the inner tooth end has a first width, and the outer tooth end has a second width; and
the first width is different from the second width.

11. The method of claim 9, wherein holding the plurality of teeth further comprises:
insulating an area in between an inner tooth end and an outer tooth end of each tooth.

12. The method of claim 9, further comprising creating at least a service loop of a predetermined length between adjacent teeth.

13. The method of claim 9, further comprising creating a modular winding set comprising a single phase.

14. The method of claim 9, wherein winding the continuous length of multi-stranded conducting wire comprises:
attaching the continuous length of multi-stranded conducting wire to a tooth using heat resistant cord.

15. The method of claim 9, further comprising installing the plurality of teeth into the stator by:
applying to the stator a polyester-based varnish; and
hardening the polyester-based varnish on the stator.

16. The method of claim 15, wherein installing the plurality of teeth further comprises installing a second segment of teeth, wherein the second segment of teeth comprises a single phase.

* * * * *

UNITED STATES PATENT AND TRADEMARK OFFICE
CERTIFICATE OF CORRECTION

| | | |
|---|---|---|
| PATENT NO. | : 11,962,207 B2 | Page 1 of 1 |
| APPLICATION NO. | : 17/892816 | |
| DATED | : April 16, 2024 | |
| INVENTOR(S) | : Baumann et al. | |

It is certified that error appears in the above-identified patent and that said Letters Patent is hereby corrected as shown below:

In the Claims

In Column 26, Line 46, Claim 1, delete "work holding" and insert -- work-holding --, therefor.

In Column 27, Line 21, Claim 9, delete "work holding" and insert -- work-holding --, therefor.

Signed and Sealed this
Twenty-third Day of July, 2024

Katherine Kelly Vidal
*Director of the United States Patent and Trademark Office*